(12) United States Patent  (10) Patent No.: US 6,697,740 B2
Smith  (45) Date of Patent: Feb. 24, 2004

(54) METHOD AND SYSTEM FOR REAL-TIME CONTROL OF SAMPLING INSTRUMENTS IN A BATCH OPERATION

(76) Inventor: William G. Smith, 250 Dannell Rd., Radnor, PA (US) 19087-4612

( * ) Notice: Subject to any disclaimer, the term of this patent is extended or adjusted under 35 U.S.C. 154(b) by 4 days.

(21) Appl. No.: 10/078,809

(22) Filed: Feb. 19, 2002

(65) Prior Publication Data

US 2003/0158675 A1 Aug. 21, 2003

(51) Int. Cl.$^7$ .............................................. G06F 19/00
(52) U.S. Cl. ................................. 702/32; 435/286.5
(58) Field of Search ........................ 702/32, 19; 622/61; 435/286.5, 287.2, 449, 2, 34, 197; 210/608, 614, 605, 656, 138; 73/26.06, 728, 864.81; 324/633, 94; 250/339.12

(56) References Cited

U.S. PATENT DOCUMENTS

| | | | |
|---|---|---|---|
| 2,907,463 A | 10/1959 | Light et al. | |
| 3,470,092 A | 9/1969 | Bernard | |
| 3,964,998 A | 6/1976 | Barnard | |
| 4,179,366 A | 12/1979 | Kaelin | |
| 4,279,753 A | 7/1981 | Nielson et al. | |
| 4,330,224 A | 5/1982 | Muramatsu et al. | |
| 4,468,327 A | 8/1984 | Brown et al. | |
| 4,522,722 A | 6/1985 | Nicholas | |
| 4,663,044 A | 5/1987 | Goronszy | |
| 4,798,673 A | 1/1989 | Huntington | |
| 4,867,883 A | 9/1989 | Daigger et al. | |
| 4,948,510 A | 8/1990 | Todd et al. | |
| 5,013,441 A | 5/1991 | Goronszy | |
| 5,021,161 A * | 6/1991 | Calltharp | ........... 210/614 |
| 5,301,100 A | 4/1994 | Wagner | |
| 5,354,458 A | 10/1994 | Wang et al. | |
| 5,395,527 A * | 3/1995 | Desjardins | ........... 210/608 |
| 5,525,231 A | 6/1996 | Ho et al. | |
| 5,552,319 A * | 9/1996 | Yang et al. | ........... 435/286.5 |
| 5,623,680 A | 4/1997 | Flora-Holmquist et al. | |
| 5,863,434 A | 1/1999 | Masseet et al. | |
| 6,049,764 A | 4/2000 | Stahl | |
| 6,398,957 B1 * | 6/2002 | Mandt | ........... 210/605 |

FOREIGN PATENT DOCUMENTS

| | | |
|---|---|---|
| CA | 997488 | 9/1976 |
| CA | 1117042 | 1/1982 |
| DE | 31 47 920 A1 | 10/1983 |
| FR | 2 550 522 | 2/1985 |
| WO | WO 01/64590 A1 | 9/2001 |

OTHER PUBLICATIONS

International Search Report Application No. PCT/US 03/04499 dated Feb. 18, 2003.

* cited by examiner

*Primary Examiner*—John Barlow
*Assistant Examiner*—Xiuqin Sun
(74) *Attorney, Agent, or Firm*—Ratner Prestia (57) ABSTRACT

A method for the sampling one or all phases of batch sewage treatment process to obtain an accurate timing of completion of one or all of the phases of the batch sewage treatment process. The number and timing of samples taken is selected to provide samples over the length of a given phase or a group of phases or all phases of the batch sewage treatment process recommended by the manufacturer of the equipment. Samples are analyzed to determine the end point of the reactions in the phase being sampled. Based upon the results of the tests the sampling regime or the timing of the phase can be revised.

14 Claims, 4 Drawing Sheets

METHOD AND SYSTEM FOR REAL-TIME CONTROL OF SAMPLING INSTRUMENTS IN A BATCH OPERATION

BACKGROUND OF THE INVENTION

1. Field of the Invention

This invention relates to a method and system for controlling and sampling of batch processes employed for the treatment of water and wastewater. More specifically, the method and apparatus of the invention provides a means of synchronizing sampling of batch water and/or batch wastewater treatment processes for adjustment and control of the batch treatment processes.

2. Description of Background Art

Over the past 10 years there has been a revival of use of the sequencing batch reactor (SBR) used for suspended growth activated sludge processes because of the inherently more efficient batch settling and often higher treatment efficiency for batch organic contaminants removal than is possible with the conventional continuous flow activated sludge process. The process employed in a SBR is often is referred to as the SBR process which uses the same vessel for batch biological reactions and quiescent batch settling. Thus, the SBR process eliminates the major cost of dedicated final clarifiers necessary for the conventional activated sludge process as well as improving solids removal performance.

However the SBR process has several disadvantages, the principal one being that it does not operate with a constant level and continuous flow, but requires intermittent operation for cycles of fill, react, settle, decant, waste and idle. Typical sequence level fluctuations are 30% to 50% of the maximum operating depth or as much as 5 to 10 feet of level fluctuations. The result is a much lower use to total volume ratio than the conventional activated sludge process. Accordingly, the SBR process is generally not cost effective for flows greater than five to ten million gallons per day (MGD).

Another disadvantage of the SBR process is that significant head loss occurs from the influent to the final effluent, requiring additional energy and pumping costs. Additionally, because the effluent flow is not continuous, flow equalization systems may be required to prevent peak loadings and adverse impacts on waters receiving the effluent from the SBR process as well as downstream processes.

Still another disadvantage of the SBR process is the requirement for labor-intensive operation under conditions of varying hydraulic and organic loadings. Since the SBR process reactors operate based on levels and timers any variation in loading requiring adjustments cannot be determined unless operating personnel are in attendance for the complete batch treatment sequence and manually sample or trigger a sampler in synchronization with the prevailing level and timer settings.

Finally, the basic process and design limitations of the SBR process make it difficult to achieve the same high efficiency biological nutrient removal possible using the continuous flow activated sludge process, especially in a small system and those subjected to wide variations in either hydraulic or organic loadings, or both.

Several improvements have been attempted to overcome the limitations of the conventional SBR process. A continuous inflow, partitioned SBR process is disclosed in U.S. Pat. No. 4,468,327, and cyclically operated intermittent flow path sequential cycle, multi-zoned recycle SBR process disclosed in U.S. Pat. Nos. 4,663,044 and 5,013,441. Significant level fluctuations, head losses and intermittent high flow rate discharges, however, still prevent these processes from overcoming all the limitations of the conventional SBR process.

Attempts have also been made over the years to overcome the level variation limitations of all SBR type processes and the cost of dedicated final clarifiers for the conventional activated sludge process. U.S. Pat. No. 3,470,092 illustrates a first attempt to develop a new suspended growth activated sludge process utilizing the concepts of both batch treatment and continuous flow. This two cell process was partially interconnected at the water surface. The alternate cell feed concept was not effective because it did not achieve a high treatment efficiency, had a low aerator utilization factor, and required long detention times to operate, resulting in expensive systems. U.S. Pat. No. 4,179,366 discloses addition of a third bottom interconnected cell, but also suffered from low treatment efficiency and ineffective changeover of untreated wastewater from the first cell to the third cell. The processes disclosed by both patents also required significant level fluctuations in the treatment cells between operating cycles which made it difficult to control flows and operate fixed, level-sensitive mechanical aeration systems.

German Patent No. 3,147,920 discloses the same three cell concept as U.S. Pat. No. 4,179,366. Although this three cell process achieved a more constant level, and overcame some of the limitations of the prior art, the process failed because it relied on expensive and unreliable mechanical gates to separate the treatment cells at various cycle times, and because treatment efficiency and effectiveness was too low to be commercially useful.

French Patent No. 2550522 describes another constant level apparatus including three separate, identical basins. This process required a large, expensive treatment system because three independent basins were required, only ⅓ of the total treatment volume was used for biological treatment at any time, and only ⅓ of the aeration equipment could be used at one time.

In spite of these attempts to improve on the performance and effectiveness of the SBR and conventional activated sludge processes, they do not provide higher treatment efficiency and hence they are not significantly more cost effective. Such attempts have either failed to totally achieve the desired benefits, or have new inherent disadvantages, which result in little or no net benefits compared to conventional methods.

Prior attempts to develop constant level processes to improve on the conventional suspended growth activated sludge process rely on the management control and recycle of mixed liquor suspended solids by back flushing or forward flushing through or around the treatment system by control of the timing and direction of wastewater flow into and through the treatment system. These methods of solids management differ significantly from variable level SBR's, and also differ from the constant level conventional activated sludge process, which settles the mixed liquor suspended solids in a dedicated final clarifier to collect and recycle the resulting activated sludge back to the aeration basin.

Sewage treatment systems are typically batch operations, flow-through (continuous) operations or a combination thereof. Various schemes, such as back-mixing and the like, are practiced. For relatively small operations which are capital-constrained, batch treatment is usually employed.

Typical waste batches contain ammonia, which can be treated, such as with certain aerobic autotropic organisms, to oxidize ammonia to nitrite and then further treat the batch to oxidize the nitrite to nitrate. This is the well-known nitrification process in sewage treatment. To complete elimination of ammonia, the nitrites and nitrates are reduced to nitrogen gas, e.g. denitrification. An aspect of batch sewage treatment, is measurement during treatment of the oxygen consuming potential. Several methods of measurement are used including measuring BOD (e.g. "Biological/Biochemical Oxygen Demand"). Accordingly, batch sewage treatment completion and process timing can be measured as a function of the concentration of ammonia ($NH_3$), nitrates/nitrites ($NO_x$), and BOD. Effective use of the measurement of these parameters is important to the economic viability of efficient batch sewage treatment operations. Such measurements are initiated by sampling of the waste being treated.

Biological nitrogen removal is a two-step process consisting of nitrification and denitrification. Nitrification occurs in the presence of oxygen by microorganisms, which oxidize ammonia to nitrate. Nitrification can occur in (1) suspended growth processes such as activated sludge, (2) in attached growth processes such as trickling filters, or (3) in combined processes such as trickling filters followed by activated sludge. A key characteristic of nitrifying organisms is that they grow more slowly than the microorganisms associated with carbonaceous BOD removal, therefore longer solids retention times are essential for nitrification to occur. Nitrification also consumes 4.6 pounds of oxygen and 7.1 pounds of alkalinity per pound of ammonia oxidized.

Nitrification is simply a nitrogen conversion process as it changes nitrogen from one form (ammonia) to another form (nitrate). While nitrogen is thus changed from a potentially toxic form with a relatively high oxygen demand to a less toxic form that does not impose an oxygen demand, total nitrogen, which is the sum of all forms of nitrogen, is not reduced. For complete biological nitrogen removal, denitrification must occur.

In biological denitrification, a different group of microorganisms uses the nitrates produced during nitrification as an oxygen source and in so doing transform nitrate to nitrogen to nitrogen gas, which then dissipates to the atmosphere. Denitrifying microorganisms require an anoxic environment free of molecular dissolved oxygen (D.O.<0.5 mg/L), along with a soluble, or dissolved, organic food source. Soluble BOD, methanol, acetate, or the volatile fatty acids from fermented sludge can serve as this food source. As with nitrification, denitrification can occur in either suspended growth, attached growth or combined processes. Denitrification produces 3.6 pounds of alkalinity per pound of nitrate reduced to nitrogen gas.

Conventional sampling instrumentation for batch sewage treatment operations is not designed by synchronizing sampling during the treatment process. Typically, a human operator does not perform multiple sampling of the various process steps during the course of a batch treatment of sewage. That is if there is no multiple sampling, no analysis of the sample is performed and a decision made as a result thereof to adjust the sampling regime during the actual sewage treatment operation. Rather, the operating step of the process are preset into the equipment by the manufacturer. The actual batch processing parameters commonly remain unchanged during the sewage treatment operation, regardless of changes in conditions or errors in the assumption that these parameter settings will address changes in conditions. For instance, in a given process the treatment of the sewage might progress faster than originally called for by the equipment manufacture, or the nature and/or the quantity of materials in the treatment tank might change. These changes, if known via sampling procedures, would have made a difference in the operating regime decided upon. As can be appreciated by those in the art, the operator of batch sewage treatment equipment is typically not the same person that performs an analysis of the samples obtained from the equipment. In real life terms, the sample must be processed and analyzed and the resulting data therefrom compared to known operating parameters, so that an operator can decide whether or not a particular stage of the treatment process has been completed. Present methods of operating a batch sewage treatment systems can result in inconsistent performance, without benefit of ongoing process adjustments for the sewage being treated. Thus, there is needed a method of operating a batch sewage treatment process which permits synchronous sampling. An operator can perform analysis of the samples to determine how the overall sewage treatment process is performing.

SUMMARY OF THE INVENTION

This present invention is a method and apparatus, or system, for the determination of the performance of each step or phase or all of the steps or phases of an SBR biological treatment process via synchronous sampling for analysis. The results of such sampling and analysis are employed to effect changes in the timers and controls of the SBR process. The method of the invention provides sychronized sampling to achieve more reliable treatment of the water and wastewater by, inter alia, reducing the amount of manual labor required for sampling of the wastewater treatment process.

According to one aspect, the present invention provides for synchronized sampling during operation of a sequencing batch reactor (SBR) process to enable an operator to sample one, several or all phases of the SBR Process and by analysis of the samples taken determine the effectiveness of the sampled phase or process.

In another aspect the present invention eliminates the disadvantages of prior art attempts to improve on SBR and conventional activated sludge processes by employing PLC controllers for process control without benefit of process analysis and performance feed back via synchronized sampling and/or analysis.

In yet another aspect the present invention provides a method for automatically sampling the treatment processes.

In still another aspect the invention provides a low cost method for synchronized sampling of the wastewater treatment processes.

In a still further aspect, the present invention provides the ability to obtain samples capable of being employed for the determination of the performance of the treatment processes in synchronization with the controls and timers provided by the manufacturers of the treatment plant equipment.

In yet a further aspect the present invention permits a user to modify and optimize existing control systems for water and wastewater treatment as a result of synchronized sampling and analysis of the samples from the treatment processes.

Another aspect the present invention makes it possible to more efficiently operate an SBR or other batch water and/or wastewater treatment process under varying organic loading and hydraulic loading conditions.

The present invention provides an improvement to the prior art and allows, automated control of the operation of sampling equipment by extracting or retrieving samples generated by sampling equipment, to permit analysis of such samples. The results of the analysis when compared to known operating parameter(s) permits modification in the sampling regime of the equipment and/or the overall process settings for the SBR.

DETAILED DESCRIPTION OF THE PREFERRED EMBODIMENT

The biological treatment of wastewater employs microorganisms. Waste is exposed to environmental conditions conducive to the breakdown of the pollutants present in the waste. The organisms under these conditions require time for the biological reactions to take place. The speed with which these reactions occur has been described as being a $1^{st}$ order reaction. These types of reactions are dependent upon the concentration of the reactant. The higher the concentration, the faster the reaction proceeds. As the concentration decreases so does the speed of the reaction. In a flow through process, the residence time of the tank is selected based upon waste characteristics, pollutants to be removed, hydraulic loading and the all-important estimated rates of reactions for the biological processes involved. In batch treatment of waste employing biological reactions the same parameters control.

Both flow through and batch types of treatment are adversely impacted by changes in waste composition, hydraulic fluctuations and/or any other factors that impact environmental conditions conducive to the optimum treatment of the waste. In both the flow through and batch treatment systems, the design criteria are based on allowing excess time for the biological reactions to occur. Excess time meaning safety factors to compensate for changes in waste loadings.

In the Sequencing Batch Reactor multiple biological reactions are employed in one tank. Environmental conditions are adjusted for each of the specific biological reactions. Sanitary waste is generated in a fluctuating pattern known as diurnal flow. In both the flow through and batch systems some form of equalization is normally employed.

Over the past 5 to 7 years, the Sequencing Batch Reactor treatment process has been employed predominately for smaller plants. Most of the smaller plants are operated for a few hours a day. The majority of these plants treat waste from residential communities. Residential communities usually have two different hydraulic patterns. One pattern is for weekdays while the other is for weekends. In the flow through process design procedures for sizing equalization basins has been available since the mid 1970's. It has been the inventor's experience that numerous batch treatment processes are being subjected to flow through design criteria for flow equalization. This has given rise to over-designed, too large a volume, equalization basins. Nothing in the literature has been found in the way of guidance for the designer. The manufacturer of the SBR unit usually provides the equalization basin. Typically equalization basin are equipped with blowers and air delivery systems for the aeration of the waste. This is provided so as to prevent the waste from becoming septic during the storage period. Interval timers are also provided for the intermittent introduction of the air. One of the problems with the current SBR is that the SBR Equalization Basins are typically designed on flow through criteria, which creates excessive storage, and over oxidization of the wastewater prior to treatment by the SBR process. This condition severely impacts the SBR process especially if the first sequence is the anoxic reactions for the denitrification process. The removal of the nitrate-nitrite employs the carbonaceous material in the raw waste as a carbon source for the denitrification. If due to over oxidation of carbonaceous material the carbon source drops below the level required for denitrification then partial or improper treatment can occur. Additional problems are also induced in the carbonaceous and ammonia removal processes in the SBR.

The hydraulics of batch treatment, specifically the SBR process play an important role in understanding the problem with the prior art. In theory, the SBR process is 100% equalized because there is no variation in flow over time. The tank is filled and then treatment sequences proceed. In reality, two things happen in actual operation that can change this. If the Equalization Basin is improperly sized for batch treatment and/or the operating levels for the Equalization Basin are not set in coordination with the batch volume problems can be incurred.

The design of a SBR treatment process involves the determination of the minimum sludge volume to be retained in the tank, microorganisms, between batches. Also to be considered is the depth of the liquid in the tank that is to be decanted after treatment. Design calculations for both of these considerations are available. In most SBR systems the SBR's batch volume is usually in the range of 40% to 60% of the full sequence volume. The full sequence volume is the related to the volume of waste generated by the entities connected to the collection system, number of batches to be treated on daily basis, Equalization Basin size and operating levels. What is critical is the relationship between how much waste is generated and the rate at which it is generated. If these considerations are not properly addressed or misaddressed then adverse impacts on biological treatment can occur. Again time becomes the important factor in both the hydraulic and biologic considerations.

Besides the previous example relating to over oxidation of the waste in the Equalization Basin, and since time is the common denominator for proper treatment, anything that impacts the time either allowed or required for treatment is critical. Included in the time factors are the rates at which the biological reactions take place. As explained previously, $1^{st}$ order reactions are concentration dependent. If the initial concentration is of some high value the reaction will proceed more rapidly at first and then decrease in rate over time. A high concentration of pollutant in the waste will require more time to reach the same final concentration of pollutant than a low value. This concern holds true for all the biological treatment processes in an SBR treatment plant. The time for each sequence in the SBR treatment process is critical for proper treatment.

Time is also a concern for the physical processes employed in a SBR treatment plant. The quiescence settling of the treated waste is a physical process wherein gravity causes the particles of biological floc to settle. The settling characteristics of the floc are dependent not only on the floc's physical characteristics but also the biological processes that produced it. The amount of time the floc requires to settle is dependent upon all of these previously mentioned variables. Since the settled waste is decanted—upper portion of clear liquid is either pumped out or siphoned out of the tank—both the time for settling and rate at which the liquid is removed are critical to process performance.

Figure 1:
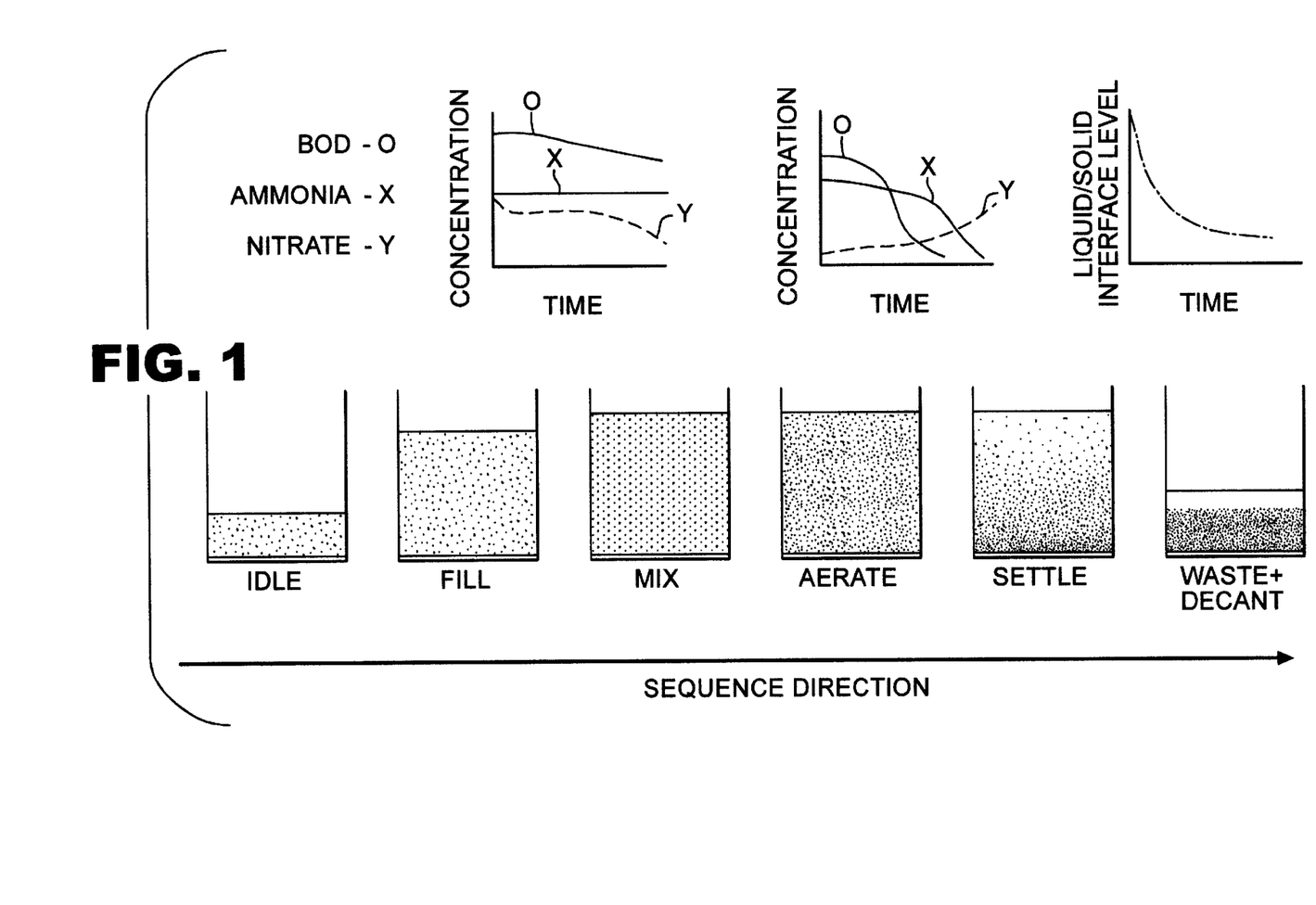
FIG. 1 is a schematic representation of the steps or phases of a conventional sequence batch reactor process with plots of certain changes in composition or physical make-up over time for selected steps or phases of the process.

FIG. 1 is a schematic representation of typical sequences in a SBR treatment process. Also depicted are graphical representations of the typical changes in either pollutant concentrations and/or physical condition.

For purposes of this example the Sequence shall be as previously employed. Also, for this example the volume of treated wastewater decanted from the reactor [batch volume] shall be 50% of the working volume. Pictured in FIG. 1 is the status of the reactor during different sequences. Also shown in FIG. 1 above the Mix and Aerate sequence are graphs depicting concentrations of pollutants in the reactor during the treatment sequence.

The Idle Sequence is when a batch has been completed and the SBR reactor is awaiting more wastewater to be transferred into it. This is the period of time when the contents of the reactor are intermittently aerated so as to keep the waste from going septic but not too much air so as to over oxidize the waste. The reactor would be 50% at this point. Either intermittently or at one time, depending upon the Equalization Basin design or pumping station design the reactor will be filled. This is referred to as the "Fill" sequence in the previous discussion. This is amount of time that is recorded on the Fill Timers on the SBRSC device.

Let it be assumed that the wastewater that has filled the SBR reactor has the following composition: BOD=200 parts per million (ppm), Ammonia—10 parts per million (ppm) and the Nitrate=0 parts per million (ppm). The reactor also has 50% of the last batch that was treated. Let it be assumed that the composition of this liquid is BOD=10 ppm, Ammonia=1 ppm, Nitrite=0 ppm and Nitrate=5 ppm. This results in the SBR reactor being filled with 105 ppm BOD, 5.5 ppm Ammonia and 2.5 ppm Nitrate. This is the composition of the waste to be treated by the sequences of steps in the SBR process.

The next sequence is the "Mix" cycle. This when the anoxic reactions take place for the removal of nitrate. A small amount of the BOD will be consumed during this process. For this example a value of 5 ppm of BOD will be consumed. No Ammonia will be removed and 95% of the nitrate will be removed leaving 100 ppm BOD, 5.5 ppm Ammonia and 0.125 ppm Nitrate. In keeping with $1^{st}$ order reactions this will take place over some period of time dependent upon initial concentrations and kinetic coefficients. The graph above the "Mix" sequence depicts what the concentration vs. time profile for each of the parameters would look like during this process. For the sake of this discussion a time of 1 hour shall be assumed adequate for these reactions to take place. As previously discussed, the desired effluent composition along with the biological reaction rates will dictate the time requirements. The time for reaction being dependent upon environmental conditions, waste concentrations, temperature and hydraulic consideration.

The next sequence is the "React" or "Aerate" cycle. The waste composition at the end of the "Mix" is what is to be treated during this sequence. During this sequence the BOD and Ammonia will be removed to the desired levels mandated by effluent criteria. The Ammonia will be converted to Nitrite and Nitrate. The nitrogen gas generated during the "Mix" sequence will also be stripped from the reactor via the air introduced for mixing as well as the oxidation of the BOD and Ammonia. For purposes of this example, let it be assumed that the BOD will be 90% removed leaving 10 ppm of BOD at the end of the sequence. The ammonia will be 95% removed leaving 0.275 ppm Ammonia. Let it also be assumed that the ammonia is completely converted to Nitrate. For this example will be assume that 5.275-ppm of Nitrate is created by the removal of the ammonia. Typically the effluent criteria for these types of systems is referred to as 10, 10, 10 meaning 10 ppm BOD, 10 ppm Suspended Solids and 10 ppm Total Nitrogen (Ammonia Nitrogen+ Nitrite Nitrogen+Nitrate Nitrogen). Again as previously discussed, the desired effluent composition along with the biological reaction rates will dictate the time requirements. The time for reaction being dependent upon environmental conditions, waste concentrations, temperature and hydraulic consideration. For purposes of this example, let it be assumed that 2 hours of aeration is required to obtain the desired results. The graph in FIG. 1 above and to the right of the "Aerate" sequence depicts what the concentration vs. time profile for each of the parameters would look like during this process.

The next sequence is the "Settle" sequence. During this process the physical separation of the biological floc created by the previous processes takes place. For purposes of this example it is assumed that the clear liquid created after the settling process has the composition of the previous sequence. It will be assumed that the liquid solid separation process produces a clear liquid that has less than 10 ppm Total Suspended Solids. The result of this process is a clear effluent with 10 ppm BOD, 0.275 ppm Ammonia, 5.275 ppm Nitrate, 0 ppm Nitrite and less than 10 ppm Total Suspended Solids. Let it be assumed that this process requires 1 hour. The graph in FIG. 1 above and to the right of the "Settle" sequence indicates the liquid-floc interface level vs. time. In flow through processes this process is monitored via settling tests wherein one observes how the floc settles in a separate container in the lab. In the SBR process, unless the operator catches the process at exact end of the "React" process he will not be able to monitor this process.

Once the "Settle" sequence is complete the "Decant" sequence occurs. This is when the "Batch Volume" is removed from the reactor. The speed with which the liquid is removed is critical. The designers of the equipment select this value and method of removal. Adverse impacts can occur if liquid removal is too rapid, settling is poor etc.

At the end of the "Settle" sequence the "Waste" sequence occurs. A timer controls this that allows a pump to transfer some of the settled floc out of the system to a waste tank. The amount of wasting is determined by lab analysis of the floc and recommendations by the manufacturer.

As can be seen from FIG. 1 without the ability to monitor each sequence as it progresses one will have to relay on assumptions to operate an SBR plant unless the operator attends the plant for all the sequences and performs sampling and analysis.

As can be seen, from the foregoing discussion of the SBR process, 5 or 6 separate processes are taking place over a typical period of time ranging from 4 to 8 hours. Most of the smaller size plants are not attended during the treatment of one complete batch. This situation gets further compounded when multiple SBR units are involved.

In flow through processes the operator can take a sample for analysis and process performance evaluation at anytime and it will be reflective of the process performance. Based upon these tests adjustments to the process can be made to improve performance. In the flow through process there are multiple tanks for the different processes, e.g. anoxic, oxic, settling etc. At any time the operator can go to each tank and take samples for process performance evaluation.

The batch treatment process, due to one tank being employed for multiple processes, requires that one be able to sample each process when it occurs. The operator would have to be there for each of the processes, e.g. anoxic, oxic, settling etc. when they occur in order to get samples for process performance evaluation.

Sampling equipment capable of taking samples over a period of time has existed for many years in the industry. Samplers, with program logic, can be programmed to start and stop at different times. Samplers can also be programmed to start at a specific time. Controls for SBR treatment plants with timers and triggers for process operation are standard with these plants.

What has not existed until the advent of the present invention is a method and an interface device between the SBR treatment plant controls and readily available sampling equipment. The present invention allows for synchronized sampling, without operator attendance, to obtain process samples for performance evaluation. It allows for the sampling to be synchronized with the process settings. The operator can now obtain samples that are indicative of plant performance. This device affords the operator the same ability to sample as if the batch process were a flow through process. It has removed the necessity of manual attendance during the complete batch process.

The major problem with operating SBR treatment plants is not being able to obtain synchronized data via sampling and analysis in order to adjusted the process settings, e.g. timers, level switches, pumps, decanters, settling periods etc. Many plants suffer from poor performance due to the lack of the ability to obtain the process information required to make adjustment related to all the aforementioned factors affecting treatment. Batch treatment requires batch sampling. Unless the batch treatment sampling is synchronized with the batch processes taking place the data will be meaningless. This device provides the ability to obtain this data and in turn more efficiently operate the plant both from an environmental compliance aspect as well as cost.

The present invention is the realization of a method and apparatus for the sampling and adjusting of the operations of the treatment process or processes for both individual sequences and or all sequences of an SBR treatment process. The present invention is a method and apparatus that provides the operator with the ability to obtain operating data upon which to alter factory or previously set operating parameters for the SBR process.

The present invention includes use of a sampling instrument for batch sewage treatment processes. Workers skilled in the art know the typical treatment steps or phases performed on a batch of sewage during a batch treatment process. Such processes typically include several different steps or phases. For instance, the process typically take place in a treatment vessel or tank and may include filling and reaction steps. The reacted contents are allowed to settle and decant. Depending upon the nature of the sewage, the aforementioned steps or phases may be performed in different sequences or with varying sub-phases. For instance, the first phase might be a filling and reaction phase. In this first phase raw sewage is sent to the treatment vessel. There may be mechanical mixing occurring during this first phase and/or aeration may occur with or without mechanical mixing during this first phase. During the treatment process additional waste mass may need to be charged to the vessel for a variety of reasons.

During the various steps or phases of a given process, samples may be drawn. The analysis of the samples is typically done at a later time. The samples may be treated so as to preserve or fix the composition at the time the sample is drawn for analysis at a later time. Typically, the results of the analysis provides the plant operators with an indication of how complete the progress of the treatment process is. Usually the steps or phases of a given treatment process regime are controlled by several mechanical or computer assisted devices. The timing of each step or phase is typically preset in accordance with the instructions of the manufacturer of the sewage treatment equipment.

Commonly Sequence Batch Reactor (SBR) plants are equipped with surge tanks (a.k.a. Equalization Tanks (EQ)). The Sequencing Batch Reactor is filled with the wastewater either from the Surge tank or directly from the sewage collection system. The SBR treatment process typically initiates its batch reactions based upon one of several alternative-triggering events. These trigger events can be the operation of a pump in the EQ basin, a wastewater level switch in either the EQ basin or the SBR tank, timer-based operation or manually initiated operation.

According to the present invention the Sequencing Batch Reactor Sampling Controller (SBRSC) is integrated into the overall process control scheme of the SBR Process specified by the SBR manufacturer. The purpose of the SBRSC is to synchronize the operation of a sampler so that synchronized samples can be obtained during any or all of the steps or phases (including the fill cycle) of the treatment process. Subsequent analysis of waste components will enable an operator to effect process changes for overall process efficiencies. Another purpose of the SBRSC is to monitor and time frequency of selected events related to the operation of the SBR and EQ basin. The SBRSC can also be used in conjunction with on-line analyzers.

Figure 2:
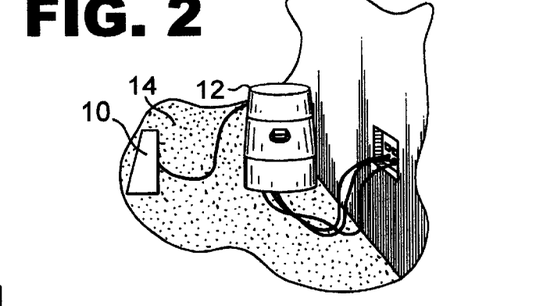
FIG. 2 is a schematic representation of the sampling apparatus of the present invention used in conjunction with a sequencing batch reactor.

Referring to FIG. 2 the box numbered 10 represents a sequencing batch reactor of the type described above. A sampling device 12 is connected via a flexible conduit 14 to the main basin or tank of the SBR 10. The sampling device 12 is adapted to take a plurality of samples over a time interval that can be preprogrammed into the device 12. One such sampling device is sold by ISCO Inc. of Lincoln Nebr. as an ISCO 6712C Compact Portable Sampler.

Figure 3:
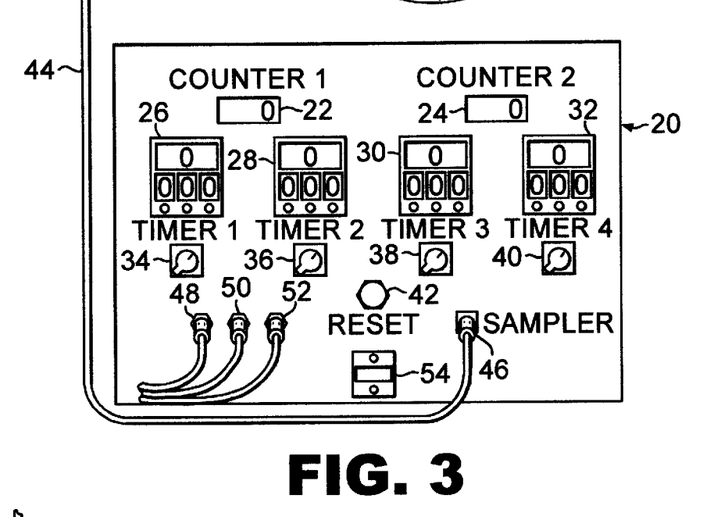
FIG. 3 is a representation of the control panel of the sampling apparatus according to the present invention.

The sampling device 12 is connected to the controller 20 shown in FIG. 3, which is constructed according to the present invention. Controller 20 includes count up or elapse timer 22, 24, count down timers 26, 28, 30 and 32 with associated on/off switches 34, 36, 38, 40 respectively. The device 20 includes a normal reset apparatus accessed via button 42. The lead 44 from the sampler 12 is connected to the panel via an electrical connector 46. The panel includes electrical connections 48 and 50 from triggering devices, e.g. equalization pumps 1 and 2, from the SBR. Connection 52 goes to the trigger mechanism for the SBR process initiation. Lastly, counter 54 is used to indicate the number of the batches treated by the SBR.

In a typical SBR system the process includes steps in which filing, mixing, aeration, settling and decanting may occur. Most typically, raw sewage is transferred into the SBR tank containing 30% to 60% waste from the previously treated batch. The raw waste is transferred into the SBR tank until the "Full" condition is achieved, as determined by a level sensor.

Once the SBR is "Full", the $1^{st}$ Sequence a mixing cycle is initiated for a period of time as determined by the adjustable duration timers provided by the manufacturer in the SBR Control Panel. The mixing cycle, without the introduction of air—anoxic, proceeds for a period of time ranging from 30 minutes to several hours, depending upon the manufacturer recommended settings. The anoxic cycle is commonly employed for the reduction of the nitrate, via nitrite to nitrogen gas, produced in the previously treated batch employing the raw waste as a carbon source. Phosphorus consumption or release may also occur during this sequence. Upon the termination of mixing a $2^{nd}$ Sequence, an aeration cycle, aerobic, is initiated. The aerobic cycle proceeds for a period of time ranging from one to several hours. During this sequence, the nitrogen gas produced in the previous sequence is stripped from the liquid. In addition the carbonaceous material (BOD) is removed as along with ammonia, depending upon the length of the sequence. The ammonia is converted nitrate during this sequence with some phosphorous uptake also occurring.

The $3^{rd}$ Sequence, Settling, begins upon the termination of aeration. This sequence proceeds for a period of time ranging from 30 minutes to over 1 hour. During this time the suspended microorganism floc will settled in the quiescence SBR tank. After the Settling Sequence a $4^{th}$ Sequence, Decanting occurs. This sequence's duration is dependent upon the decanting rate which is set by the decant pump design and the predetermined batch volume to be decanted. The $5^{th}$ Sequence is the Sludge Wasting. A timer in the SBR Control Panel sets this sequence. The duration of the wasting is estimated by the desired sludge age for the biological process. Operators skill in the art of operating SBR systems will take manual samples of the settled sludge after the settling process and during the aeration process. These values are employed to calculate the amount of sludge to be wasted based upon a desired sludge age. Knowing the pumping rate of the waste sludge pump the Waste Timer is manually set to a value to accomplish the desired wasting.

A $6^{th}$ Sequence, Idle is initiated if another batch of wastewater is not available for immediate treatment. During this sequence a timer in the SBR Control Panel operates a blower for intermediate periods of aeration. This sequence occurs to keep the idling organisms in the SBR from going septic.

Referring back to FIG. 3, the timers 26, 28, 30 and 32 can be used to replicate the manufacturer's timers in the SBR Control Panel. In a typical SBR process, as previously described, these timers would be employed for Sequences 1, 2, 3, and 4 respectively e.g. Mix, Aerate, Settle and Decant. Timer Counter 22 begins counting upward when sewage is transferred into the SBR and stops counting when the $1^{st}$ Sequence of the SBR treatment process begins, usually the Mix Cycle as described previously. Counter 22 indicates the transfer time of the raw waste into the SBR reactor tank. Timer Counter 24 is used for a second batch treatment, thus Timer Counters 22 and 24 give indications of the Fill time for two cycles of the SBR reactor.

With the device 20 set to replicate the sequence of the SBR the SBRSC 20 can then, through the sampler conduit 44, send a signal to the sampling device 12 to take samples in accord with a predetermined sequence. In other words if the efficacy of the first phase indicated by timer 26 is to be checked the sampling device 12 can be called upon to sample the entire phase in predetermined increments with the sampler 12 being capable of taking up to 24 vials samples. Single, Multiple or composite samples, can be taken and introduced into each vial so that the 24 vials can represent a large number of samples. The sampler 12 can be used to sample the entire progress of the first phase divided up into 24 time increments. Conversely, if only a few samples are required the controller 20 can be programmed to take only the necessary number of samples during this first phase. The succeeding phases of the SBR process can be sampled in a like manner using all or a portion of the sampler to effect a representative sample of the phase. The sampling device 12 is enabled by switches 34, 36, 38 and 40 for timers, 26, 28, 30 and 32 respectively.

The samples collected in sampler 12 are then analyzed and any changes that are necessary in the SBR process can be made since the operator now has a picture of one or all phases of the SBR process.

As pointed out a single phase can be sampled in accordance with the capacity of the sampler 12 or all phases can be sampled in increments so that all phases have a periodic sample in accord with the capacity/frequency of the sampler 12. The sampling frequency will depend upon the phase being tested to give the operator of the SBR the most complete picture of the operation of the SBR.

For example, if only the first phase of the SBR process is sampled via 24 samples and the samples are analyzed, the end point of the phase can be determined in accord with the results of the individual samples. If in fact, the samples indicate the first phase can be for a shorter time duration (based upon the speed of the biological reaction), then the operator can go back and shorten the time for the first phase of the SBR process. Conversely, if the samples show the time of the phase has to be increased this can be done also and then the timers on apparatus 20 can be reset and the process sampled accordingly. At the same time the sampling regime will be used to sample the reset phase. Using this method the operator of the SBR can get a complete picture of the process and can make necessary corrections so that process adjustments can be made based upon actual process performance rather than assumptions.

Figure 4:
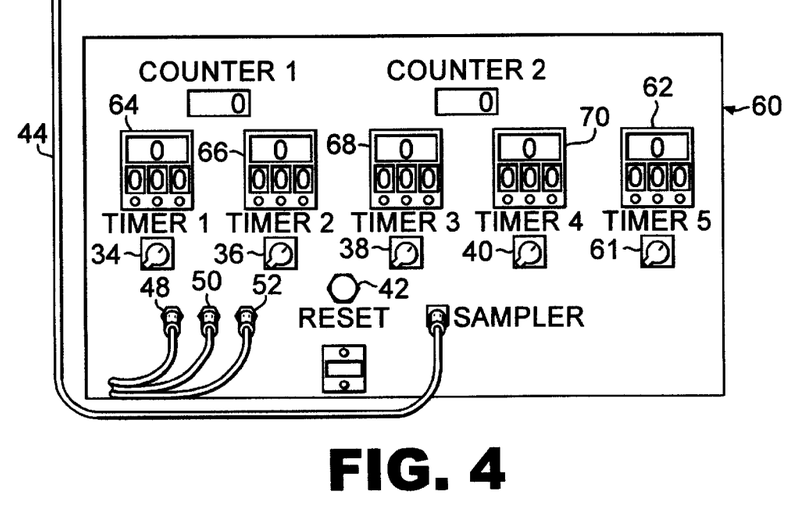
FIG. 4 is a representation of the control panel of the apparatus of the present invention adapted for an alternate SBR process sequence.

FIG. 4 shows an SBR controller 60 adapted for a batch sewage treatment process employing a different set of steps or phases. In the controller 60 a fifth timer 62 and associated on/off switch 61 can be added, for example if the fill and mix cycles are to be timed separately by timers 64, 66, the aeration cycle by timer 68 and the settle time by timer 70 the timer 62 times the decant cycle.

Figure 5A:
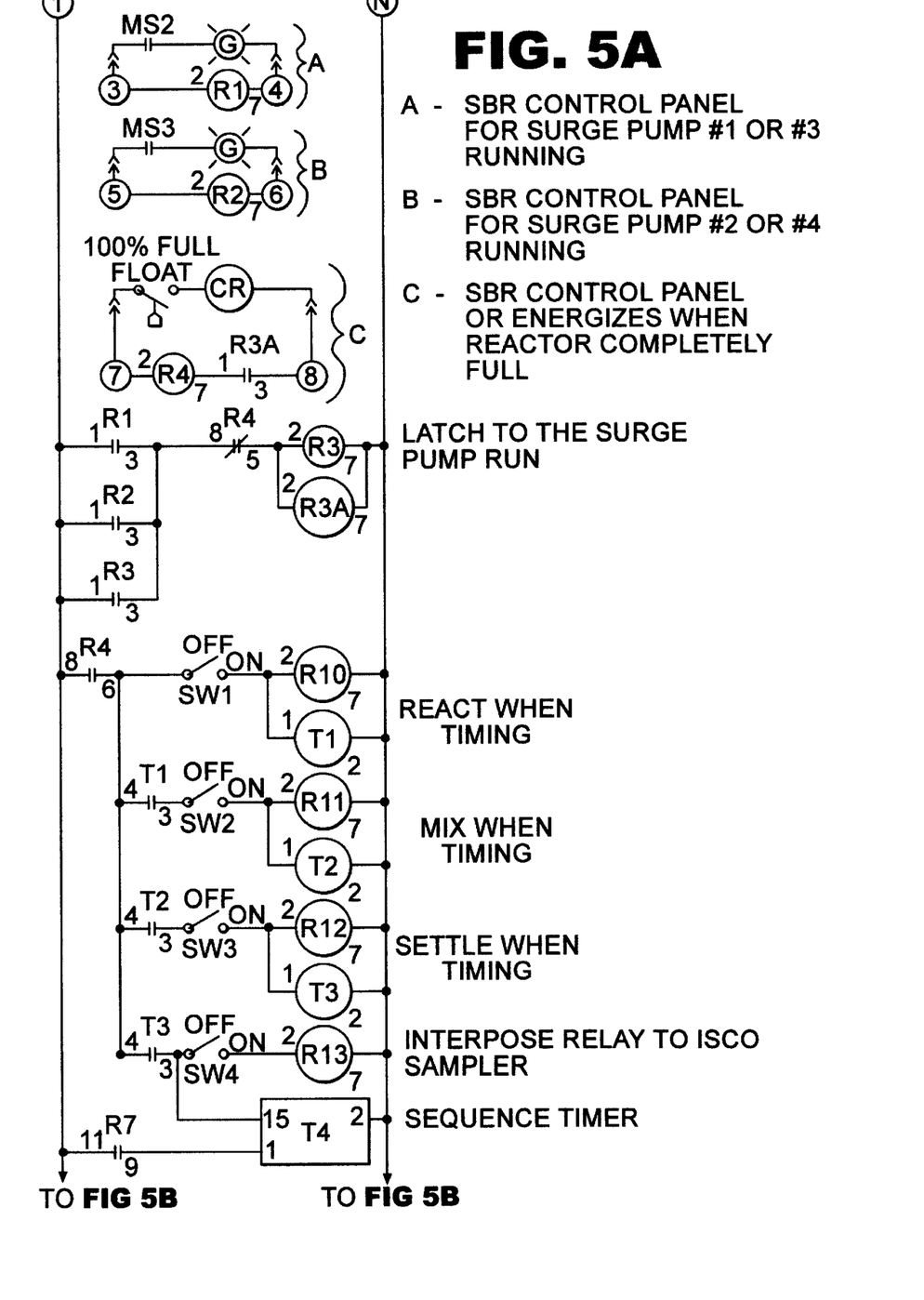
FIG. 5 in sub-parts A and B is a schematic diagram of a control system for sampling according to the present invention.

FIG. 5 is an electrical diagram of the controller according to the present invention, which shows in schematic form the operation of the control system for sampling according to the present invention.

Motor Starter 2 (MS2) and Motor Starter 3 (MS3) are in the SBR Control Panel and/or Pump Control Panel. Wires 3 and 4 and wires 5 and 6 parallel these operating lights for the transfer (surge) pumps either in the Equalization Basin or pumping station. The pumps are controlled by level from within the SBR Control Panel. Upon either of these pumps operating Relays R1 or R2 are energized. This in turn starts one of the Fill Duration Timers shown on FIG. 5B by the boxes labeled Hours.

Figure 5B:
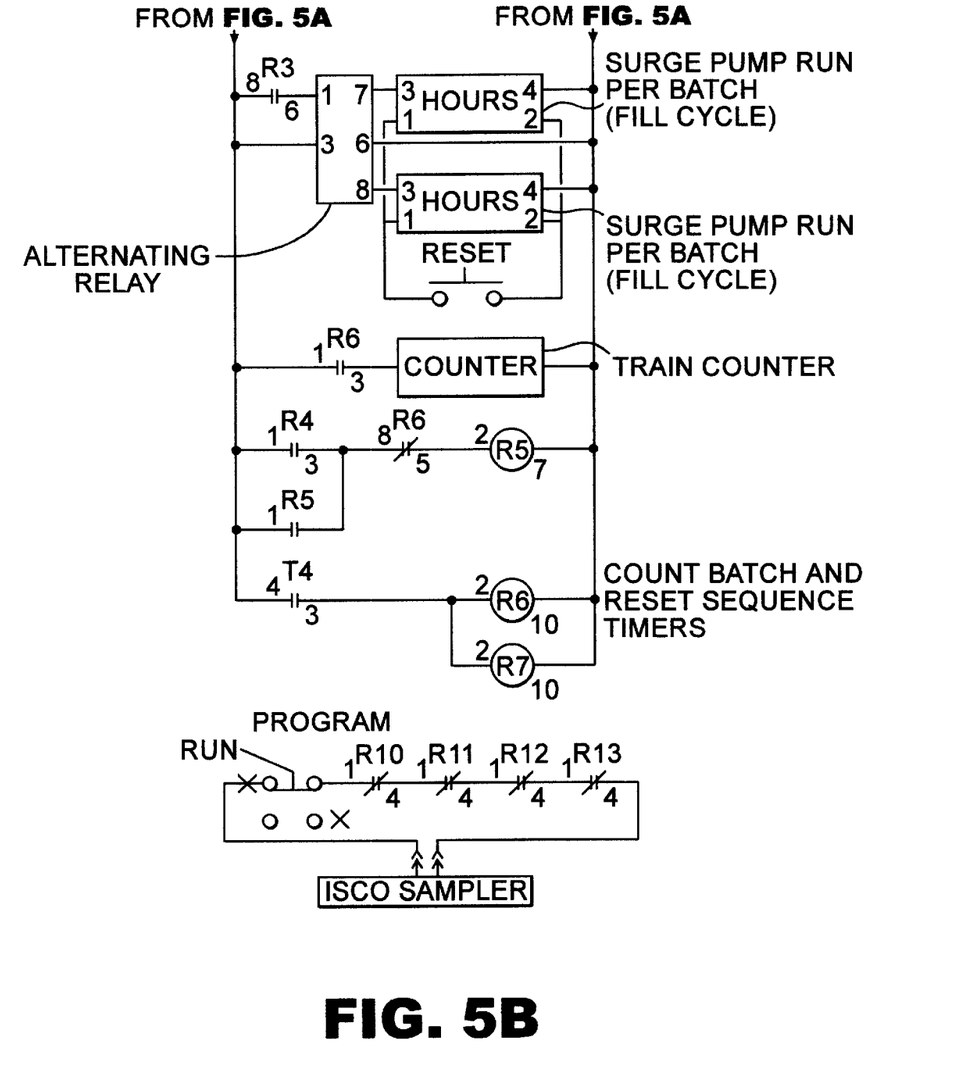

Once the SBR unit is full, as determined by float control CR, the 100% Full Float Relay R4 is energized. Relay R3 and R3A contacts are made by the function of either of the transfer pumps. Relay R3 and R3A coils are in parallel to provide the required number of contacts. R4 contact 8/5 is normally and will open when the 100% full condition no longer prevails. R4 enables the Sequence Count Down Timers T1, T2, and T3. Which one of the Sequence Count Down Timers will function for sampling purposes is determined by the "On-Off" Switch condition of switches 34, 36, 38, 40 on the SBRSC Panel shown on FIG. 3. SW1, SW2, SW3, SW4 are Devices 34, 36, 38, 40. The settings for Sequence Count Down Timers are adjusted manually to the desired values that have been set for the SBR Control Panel Timers. When R4 is energized Timer T1 for the first batch sequence is energized and begins to time downward. Relay R10 is energized and now will allow the sampler to operate provided that the Selector Switches (Devices 34, 36, 38, 40) on the SBRSC Panel shown on FIG. 3 are in the "On" position. Upon Sequence Count Down, Timer T1 times out and an internal contact in T1 will close and energize Sequence Count Down Timer T2 as well as Relay R11. This allows Sequence Count Timer T2 to begin timing down and allow sampler 12 to operate, provided the appropriate Selector Switch is in the "On" position. Sequence Count Down Timer T3 and R12 function in a like manner. Any number of Sequence Count Down Timers and Relays can be employed in this manner. When the last Sequence Timer times out, Timer T4 is energized. This operates the Counter 54. Counter 54 indicates the number of times the SBRSC has performed a full sequence. It has its own integral manual resetting device. The other Relays reset the system for the next batch to be treated. Upon initiation of the second batch sequence the Alternating Relay will switch to the Second "Fill Duration Timer". Any number of these "Fill Timers can be employed for other configurations.

A typical SBR process may receive incremental amounts of wastewater from the EQ Basin and/or sufficient wastewater to initiate the start of the SBR treatment process. The SBRSC employs elapse timers to monitor the amount of time it takes from initiation of the waste transfers until the start of the SBR batch treatment process. These times are indicated on the duration timer(s) on the SBRSC. Upon initiation of the SBR treatment process, the SBRSC duration timer switches to the next sequence timer for monitoring of the next wastewater transfer in the SBR initiation of next batch treatment process. The number of transfer timers is a function of the users specification and number of SBR unit and/or batches for which monitoring is desired.

Once the SBR treatment process has been initiated the first of the multiple settable countdown timers begins its countdown from its manual, remote, programmed or SBR Control Panel interfaced setting. Interlocked to each of these timers is a selector switch, which permits the user to choose whether or not to initiate sampling. A sampler interface connector is provided for operation of the sampling device.

Each countdown timer has an interlocked sampler initiation selector switch. These switches allow for sampling of each sequence or all sequences based on the user's selection. This allows for sampling of any or all of the SBR's treatment sequences.

The SBRSC can be employed with any sampling device to collect either composite (time base incremental samples combined into one sample) or discrete samples (individual samples based upon time criteria), as the particular application requires. This discrete/composite samples can be analyzed and selected pollutants can be profiled. Analysis of the sampling data will allow the SBR process operator to make adjustments of the timers controlling the SBR treatment process according to actual field sampling data. In installations where operating personnel are not available on a continuous basis, synchronized plant process sampling can be facilitated and process adjustment facilitated by analysis of the samples collected at a later time.

In the present invention, a sampling device or apparatus is operated during time period by a program fixing the number of samples being drawn, the time between sampling, and the sampling volume. The analysis of the samples is used to, either adjust the sampling regime to get the most accurate picture of the process being tested, or timing of the process regime of the batch reactor. This enables an operator to more precisely fix the length of the reaction time for a treatment phase or each phase of the process. If the analysis shows the reaction time is faster than the equipment manufacturer's pre-set condition the overall process timing scheme is adjusted by completing this phase earlier and going onto the next phase. If the analysis shows the phase is not complete but the factory pre-set conditions would initiate the next phase, then the operator can increase the time for that phase and reset the sampling regime to take further samples to verify the timing for the extended phase. Typically, a sequencing batch reactor is received from a manufacturer with specifications for time periods of operation with no sampling processor. The present invention uses values obtained in the sampling and analysis process to enable the user or operator of the SBR to adjust the time for reaction periods in a particular phase or phases of the batch equipment.

The following example illustrates one embodiment of the present invention:

EXAMPLE

A sequencing batch reactor is to be operated with a specification time period of two hours for aeration. An automatic sampler is used, such as described above, to withdraw up to twenty four vials of samples. If the aeration period takes 120 minutes, sampling once per minute on the minute is programmed with sampling volume calculated so that three sequential samples are combined into a single averaged batch sample per vial. Under such programming, twenty four sample vials are collected. The samples are analyzed and the respective concentration curve for BOD, is calculated. Based upon a review of the curve generated, the optimized time periods are determined and the time sequencing of the batch equipment adjusted accordingly. Preferably, similar sampling and adjustments are continued inasmuch as batch-to-batch differences will cause a drifting in the optimal values of the respective T1 and T2 times. Variables such as seasonal changes, treatment volume demands and materials can change over time, usually in a sufficiently well-ordered trend to afford the opportunity to adjust the operational values. Because the phase times are optimized, treatment efficiencies and operating costs can be optimized by the plant operator.

In a preferred embodiment of the invention the process is one which comprises synchronizing the number of samples drawn during a treatment phase, the time between taking of said samples, and the volume of said samples.

Samples from the sewage batch are drawn during the treatment of the sewage. Thereafter, an analysis is made of the samples to obtain data therefrom. This data is then analyzed to obtain a profile or picture of the process.

It is within the scope of the present invention to modify a conventional SBR control panel to perform the functions performed by the SBRSC of the present invention by incorporating the logic and electrical components of the present invention into the SBR Panel.

The present invention can be applied for real-time control of a driver or computer application program-assisted sampling instrument. In this method the following steps are performed:

(1) inputting a first set of operational instruction(s) for a sampling instrument to obtain samples from a batch sewage treatment process;

(2) obtaining one or more sample(s) from the sewage during a treatment phase of the process;

(3) performing a screening evaluation to select which one or more sample(s) to analyze;

(4) analyzing said selected one or more sample(s) to obtain data therefrom;

(5) inputting said data into an expert database;

(6) processing said inputted data in the expert data system;

(7) providing one or more second operational instruction based upon the results of said processing to replace one or more operational instruction(s) in said first set; and (8) inputting said one or more second operational instruction(s) to the driver or computer application program-controlled sampling instrument to further control sampling.

In one embodiment an intermediate step 4a consisting of performing a screening evaluation to select which data to input in step (5) is interposed between step (4) and step (5). Similarly, in another embodiment an intermediate step (7a) consisting of performing a screening evaluation to determine which one or more second operational instruction(s) to input in step (8) is interposed between step (7) and step (8). Steps (4a) and/or (7a) can be performed by a human.

Having thus described my invention what is desired to be secured by Letters Patent of the United States is set forth in the appended claims.

What is claimed is:

1. A method for sampling a sequencing batch reactor sewage treatment process, comprising the steps of:

(a) integrating a computer driver process control system with a sampling system and an analysis system;

(b) inputting a first set of operational instruction(s) to said sampling system to obtain samples from said batch sewage treatment process;

(c) obtaining one or more sample(s) from said batch sewage treatment during one of a selected, a selected group of, or all phases of said sewage treatment process;

(d) performing a screening evaluation to select one of, one or more samples to be analyzed for specific physical or chemical data;

(e) performing a screening evaluation to select which data will be input into step (f);

(f) inputting said physical or chemical data into said computer for comparison with data indicating said sewage treatment process is operating in accord with parameters suggested by the manufacturer of equipment used to effect said sequencing batch reactor sewage treatment process;

(g) using said computer to generate a new operational instruction based upon the results of said data comparison;

(h) performing a screening evaluation to determine the nature of said new operational instruction to input in step (i); and (i) inputting said new operational instruction to said sampling system to one of maintain said sampling regime or alter said sampling regime in order to obtain a true picture of operation of said sequencing batch reactor process.

2. A system for sampling a sewage treatment process in a sequencing batch reactor comprising in combination:

an apparatus adapted to withdraw and hold samples of sewage from said sequencing batch reactor according to a regime inputted into said apparatus;

a controller adapted to initiate and terminate sampling by said apparatus, said controller including first means to enable a user to input into said controller resettable count down timers for each phase of said sewage treatment process, said controller including resettable switches to enable or disable signals to said apparatus for withdrawing samples said switches set by an operator in accord with a desired pattern of sampling one of, a selected, a selected group, or all phases of said sewage treatment process; and said controller including indicators to indicate beginning of a sequencing batch reactor treatment cycle.

3. A system according to claim 2 including means to indicate the number of complete treatment cycles of said sequencing batch reactor.

4. A system according to claim 2 wherein said controller includes one of an analog or digital interface with said apparatus to enable or disable said apparatus in accord with a sampling regime selected during a complete cycle of said sequencing batch reactor process.

5. A system according to claim 2 including an interface between said sample system and a control system for a sequencing batch reactor used to perform said sequencing bed sewage treatment process whereby said control system for said sequencing batch reactor provides a trigger for said system.

6. A control system for a sequencing batch comprising in combination:

means to enable a user to input into resettable count down timers in said means for each phase of a treatment process conducted by a user of said sequencing batch reactor, said means including resettable switches to enable or disable signals to an apparatus adapted to withdraw and hold at least one of a single sampler or multiple samples of sewage from said sewage treatment process, said switches set by an operator in accord with a desired pattern of sampling one of, a selected, a group, or all phases of said sewage treatment process; and indicators to indicate beginning of a sequencing batch reactor process cycle.

7. A control system according to claim 6 including means to indicate the number of complete treatment cycles of said sequencing batch reactor.

8. A control system according to claim 6 wherein said control system includes one of an analog or digital interface to enable or disable said control system in accord with a sampling regime selected during a complete cycle of said sequencing batch reactor process.

9. A control system according to claim 6 including an interface between said control and a control system for a sequencing batch reactor used to perform said sequencing batch sewage treatment process whereby said control system for said sequencing batch reactor provides a trigger for said system.

10. A method for modifying the control system for a sequencing batch reactor comprising the steps of:

installing means to enable a user to input into resettable count down timers in said means times for each phase of a treatment process conducted by a user of said sequencing batch reactor, said means including resettable switches to enable or disable signals to an apparatus adapted to withdraw and hold at least one of, a single sample or multiple samples of sewage from said sewage treatment process, said switches set by an operator in accord with a desired pattern of sampling one of, a selected, a group, or all phases of said sewage treatment process; and installing indicators to indicate beginning of a sequencing batch reactor process cycle.

11. A method according to claim 10 including the step of installing indicating means to indicate the number of complete treatment cycles of said sequencing batch reactor into said control system.

12. A method according to claim 10 including the step of installing one of, an analog or digital interface in said control system to enable or disable said control system in accord with a sampling regime selected during a complete cycle of said sequencing batch reactor process.

13. A method according to claim 10 including the step of installing an interface between said control system and a control system for a sequencing batch reactor used to perform said sequencing batch sewage treatment process whereby said control system for said sequencing batch reactor provides a trigger for said system.

14. A method for sampling a sequencing batch reactor sewage treatment process, comprising the steps of:

(a) integrating a computer driver process control system with a sampling system and an analysis system;

(b) inputting a first set of operational instruction(s) to said sampling system to obtain samples from said batch sewage treatment process;

(c) obtaining one or more sample(s) from said batch sewage treatment during one of a selected, a selected group of, or all phases of said sewage treatment process;

(d) manually performing a screening evaluation to select one of, one or more samples to be analyzed for specific physical or chemical data;

(e) manually performing a screening evaluation to select which data will be input into step (f);

(f) inputting said physical or chemical data into said computer for comparison with data indicating said sewage treatment process is operating in accord with parameters suggested by the manufacturer of equipment used to effect said sequencing batch reactor sewage treatment process;

(g) using said computer to generate a new operational instruction based upon the results of said data comparison;

(h) performing a screening evaluation to determine the nature of said new operational instruction to input in step (i); and (i) inputting said new operational instruction to said sampling system to one of maintain said sampling regime or alter said sampling regime in order to obtain a true picture of operation of said sequencing batch reactor process.

* * * * *

UNITED STATES PATENT AND TRADEMARK OFFICE
CERTIFICATE OF CORRECTION

PATENT NO. : 6,697,740 B2
DATED : February 24, 2004
INVENTOR(S) : William G. Smith It is certified that error appears in the above-identified patent and that said Letters Patent is hereby corrected as shown below:

<u>Title page,</u>
Item [56], References Cited, U.S. PATENT DOCUMENTS, please delete "4,330,224 A 5/1982 Muramatsu et al." and substitute therefor -- 4,430,224 2/1984 Fuchs --

Signed and Sealed this

Sixth Day of July, 2004

JON W. DUDAS
*Acting Director of the United States Patent and Trademark Office*